United States Patent
Lin et al.

(10) Patent No.: US 10,452,565 B2
(45) Date of Patent: Oct. 22, 2019

(54) SECURE ELECTRONIC DEVICE

(71) Applicant: SunASIC Technologies, Inc., New Taipei (TW)

(72) Inventors: Chi Chou Lin, New Taipei (TW); Hao-Jyh Liu, New Taipei (TW); Zheng Ping He, New Taipei (TW)

(73) Assignee: SUNASIC TECHNOLOGIES, INC., New Taipei (TW)

( * ) Notice: Subject to any disclaimer, the term of this patent is extended or adjusted under 35 U.S.C. 154(b) by 177 days.

(21) Appl. No.: 15/869,394

(22) Filed: Jan. 12, 2018

(65) Prior Publication Data

US 2019/0220419 A1    Jul. 18, 2019

(51) Int. Cl.
| | |
|---|---|
| *G06F 12/14* | (2006.01) |
| *G06Q 50/18* | (2012.01) |
| *G06F 21/10* | (2013.01) |
| *G06F 21/57* | (2013.01) |

(52) U.S. Cl.
CPC ........ *G06F 12/1408* (2013.01); *G06F 21/105* (2013.01); *G06Q 50/184* (2013.01); *G06F 21/575* (2013.01); *G06F 2212/1052* (2013.01); *G06F 2221/034* (2013.01); *G06F 2221/0768* (2013.01)

(58) Field of Classification Search
CPC .. G06F 21/1408; G06F 21/105; G06Q 50/184
See application file for complete search history.

(56) References Cited

U.S. PATENT DOCUMENTS

| | | | | |
|---|---|---|---|---|
| 9,842,212 | B2* | 12/2017 | Oxford | G06F 21/575 |
| 9,953,166 | B2* | 4/2018 | Newell | G06F 21/575 |
| 10,303,885 | B2* | 5/2019 | Hughes | G06F 21/575 |
| 10,360,042 | B2* | 7/2019 | Scholze | G06F 3/0622 |
| 10,382,436 | B2* | 8/2019 | Chien | G06F 21/44 |
| 2006/0059553 | A1* | 3/2006 | Morais | G06F 12/1408 |
| | | | | 726/22 |
| 2017/0093567 | A1* | 3/2017 | Gopal | H04L 9/0861 |
| 2018/0260569 | A1* | 9/2018 | Sutton | G06F 21/575 |
| 2018/0294962 | A1* | 10/2018 | Kraemer | H04L 9/3221 |

* cited by examiner

*Primary Examiner* — Lynn D Feild
*Assistant Examiner* — Viral S Lakhia
(74) *Attorney, Agent, or Firm* — Jackson IPG PLLC; Demian K. Jackson (57) ABSTRACT

A secure electronic device is disclosed. The secure electronic device includes a first core processing unit, a secure boot Read-Only Memory, a first non-volatile memory, a first volatile memory and a first communication interface. A new framework based on the secure electronic device with built-in security is able to safeguard intellectual property for the developers and further improves the security of the secure electronic device. Thus, more developers can launch their programs or services without being stolen or tampered by an unauthorized party.

11 Claims, 6 Drawing Sheets

SECURE ELECTRONIC DEVICE

FIELD OF THE INVENTION

The present invention relates to a secure electronic device. More specifically, the present invention relates to a secure electronic device with intellectual property protection mechanism.

BACKGROUND OF THE INVENTION mobile devices are widely used in our daily life and the Internet of things (IoT) has been developed rapidly, raising a surge in demand for security. Many approaches to security are developed to fit the security requirements. Trusted Platform Module (TPM) is an implementation of a secure cryptoprocessor that brings the notion of trusted computing on x86 platforms. Similar to how TPM works to make PCs "trustworthy", TrustZone is a System on Chip (SoC) and CPU system-wide approach to security aimed at establishing trust in ARM-based platforms.

U.S. Pat. No. 7,305,534 discloses a data processing apparatus and method for controlling access to a memory to divide the data processing apparatus into a secure domain and a non-secure domain. U.S. Pat. No. 7,966,466 discloses a memory access control circuitry to control access to memory address space. Both approaches are utilized by the ARM TrustZone technology to separate a SoC into the secure domain and a non-secure domain.

However, these approaches did not provide content protection inside the secure domain. The content protection is needed for different trustworthy developers to co-work inside the secure domain. The content protection may be provided in the non-secure domain using virtualization technology for high-end SoC, but it is not suitable for low-cost products because of limited computational power and resources, e.g., memory size.

While two or more different developers are going to deal with the secure data inside a secure world, they all need the right to access the secure world to store their codes respectively. In this scenario, the trustworthy developers have to co-work inside the secure world. But this does not mean they have to abandon the safeguard of their intellectual property. A new framework based on the built-in security device to provide content protection to the executable codes (intellectual property) for the developers is needed.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A secure electronic device is provided by the present invention. The secure electronic device is configured to implement a secure environment with a number of secured executable codes having content protection features. The secure electronic device comprises: a first core processing unit (CPU), for processing an authentication process, managing a secured executable code transferring process, and executing secured executable codes and general purpose applications, wherein the authentication process comprises a bi-directional verification between the secure electronic device and a plurality of code transfer devices; the first core processing unit is able to be configured into two isolate environments: a secure environment and a normal environment using hardware sliced or time sliced method so that any instructions and data inside the secure environment cannot be directly accessed from the normal environment or an external device; a secure boot Read-Only Memory (ROM), coupled to the first core processing unit, having a first private key stored therein, wherein the first private key is used for the code transfer devices to verify the secure electronic device; a first non-volatile memory, coupled to the first core processing unit, wherein the first non-volatile memory is able to be configured into two isolated parts: a first protected non-volatile memory, for storing a first secured executable code entry and a second secured executable code entry; and a general purpose non-volatile memory, for storing general purpose applications and data associated with the general purpose applications, wherein the first secured executable code entry comprises a first secured executable code and a second public key of a second asymmetrical cryptography; the second secured executable code entry comprises a second secured executable code and a third public key of a third asymmetrical cryptography; the second and third public keys are used for the secure electronic device to verify the code transfer devices; at least a portion of the first protected non-volatile memory where the secured executable codes stored therein is configured into execute-only memory (XOM); a first volatile memory, coupled to the first core processing unit, wherein the first volatile memory is able to be configured into two isolated parts: a first protected volatile memory, for temporarily storing secure data for the core processing unit; and a general purpose volatile memory, for temporarily storing data associated with the general purpose applications for the core processing unit; and a first communication interface, for communicating with the code transfer devices, wherein the data exchange between the secure electronic device and the code transfer devices are encrypted/decrypted using a symmetric session key if the authentication process is successful, wherein a first public key stored in the code transfer devices and the first private key are a pair keys of a first asymmetrical cryptography; the second public key and a second private key stored in a first code transfer device are a pair keys of the second asymmetrical cryptography; and the third public key and a third private key stored in a second code transfer device are a pair keys of the third asymmetrical cryptography.

According to the present invention, the code transfer device comprises: a second core processing unit, for processing an authentication process and managing the secured executable codes transferring process; a second protected non-volatile memory, for storing the first public key of the first asymmetrical cryptography and one of the private keys, wherein at least a portion of the second protected non-volatile memory where the first public key and the private key stored therein is protected by a protection mechanism to prevent the stored codes and data from being directly accessed by an external agent; a second protected volatile memory, for temporarily storing data for the second core processing unit; and a second communication interface, for communicating with the secure electronic device.

Preferably, the second protected non-volatile memory further sorts a copy of the secured executable codes; at least a portion of the second protected non-volatile memory where the secured executable codes stored therein is protected by the protection mechanism to prevent the stored codes and data from being directly accessed by an external agent.

According to the present invention, the code transfer device may further comprise: a file encryption key stored in the second protected non-volatile memory; and a removable external memory unit, for storing a copy of the secured executable codes, wherein the secured executable codes are encrypted using the file encryption key.

The authentication process and an encrypt/decrypt system used in the secured executable code transferring process are hardware circuits built in the first core CPU, or instructions stored in the secure boot ROM and been executed by the first core CPU after a boot sequence Preferably, the first asymmetrical cryptography may be Elliptic-curve cryptography (ECC) or RSA. The second asymmetrical cryptography may also be ECC or RSA. The secure electronic device may be a system on chip (SoC). The code transfer device may also be a SoC.

The code transfer device may further include a license management system which has a license control file for storing management information. The management information may be license counts and/or the configuration information of each installation.

DETAILED DESCRIPTION OF THE PREFERRED EMBODIMENTS

The present invention will now be described more specifically with reference to the following embodiments.

Figure 1:
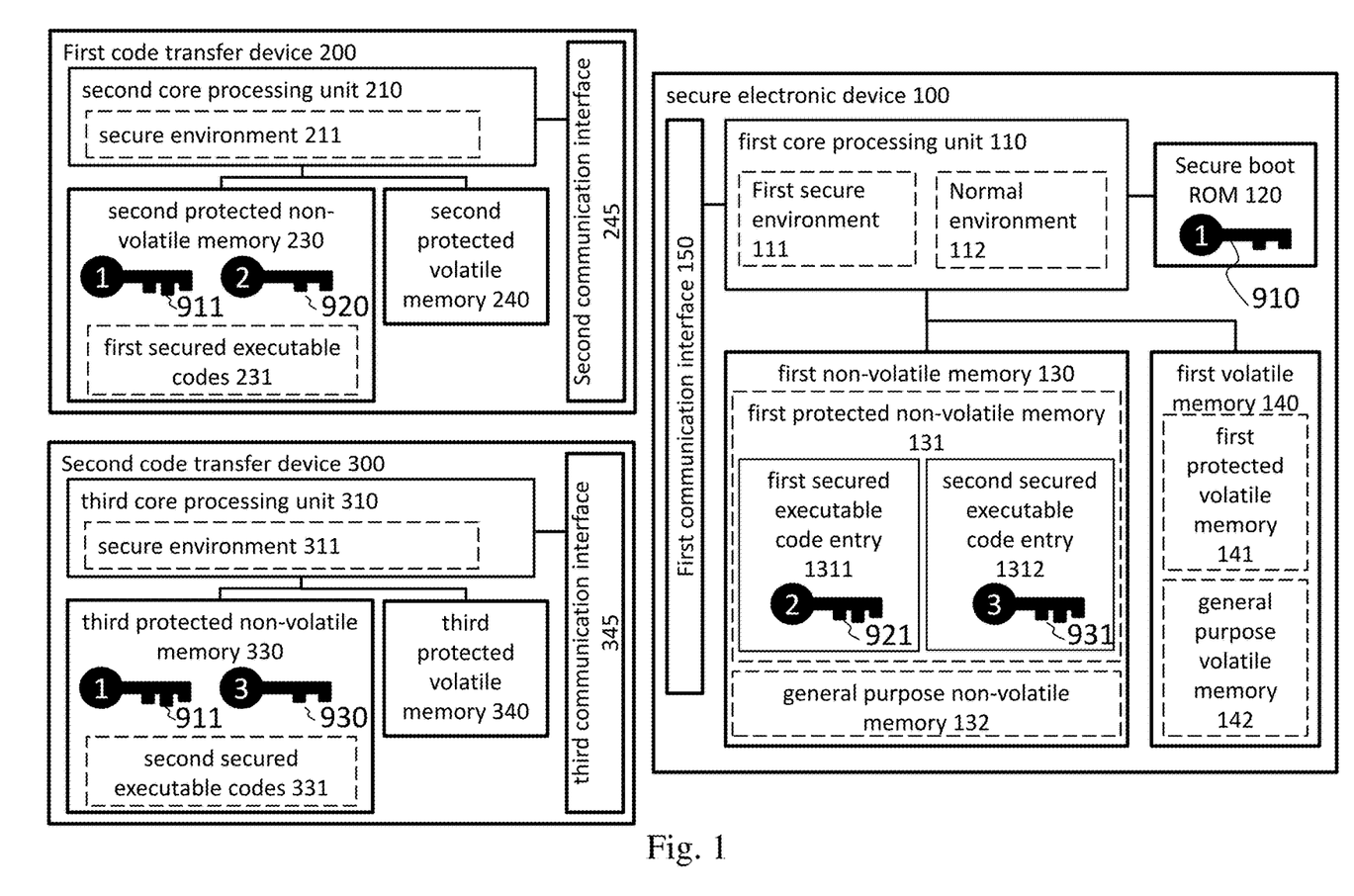
FIG. 1 is a block diagram of a secure electronic device and two code transfer devices of a first embodiment according to the present invention.

Please refer to FIG. 1. FIG. 1 is a schematic diagram of a secure electronic device 100 and two code transfer devices (200 and 300) according to the present invention. The secure electronic device 100 includes a first core processing unit (CPU) 110, a secure boot read-only memory (ROM) 120, a first non-volatile memory 130, a first volatile memory 140, and a first communication interface 150. The secure boot ROM 120, the first non-volatile memory 130, the first volatile memory 140, and the first communication interface 150 are coupled to the first core processing unit 110, and they may form a System-on-Chip (SoC) to improve the security of the secure electronic device 100. The secure electronic device 100 is used to implement a secure execution environment which is isolated from a normal execution environment. The instructions related to sensitive data, e.g., personal information or security functions, are executed in the secure execution environment to prevent those secrets from being stolen. To accomplish the isolation of the two environments, the first core processing unit 110, the first non-volatile memory 130 and the first volatile memory 140 are each configured into two isolated parts. The first core processing unit 110 is separated into a first secure environment 111 and a normal environment 112. The first core processing unit 110 utilizes hardware sliced or time sliced method so that any instructions and data inside the first secure environment 111 cannot be directly accessed from the normal environment 112 or an external device. The first core processing unit 110 also processes an authentication process, manages a secured executable code transferring process, and executes secured executable codes in the first secure environment 111, and executes general purpose applications in the normal environment 112. The authentication process includes a bi-directional verification between the secure electronic device 100 and a first code transfer device 200 (or a second code transfer device 300, depending on which device the secure electronic device 100 is communicating with). The first non-volatile memory 130, e.g., FLASH memory, is configured into a first protected non-volatile memory 131 and a general purpose non-volatile memory 132. Sensitive data and instructions related to the sensitive data are stored in the first protected non-volatile memory 131, and other data and/or instructions, such as general purpose applications, are stored in the general purpose non-volatile memory 132. The instructions related to the sensitive data are stored in the form of executable codes and referred to secured executable codes later. At least a first and a second secured executable code entries (1311 and 1312 respectively) are stored in the first protected non-volatile memory 131. The first secured executable code entry comprises a first secured executable code and a second public key 921 of a second asymmetrical cryptography. The second secured executable code entry comprises a second secured executable code and a third public key 931 of a third asymmetrical cryptography. The asymmetrical cryptographies are used for the bi-directional verification which will be described in later paragraphs. The first volatile memory 140, e.g., SRAM, is configured into a first protected volatile memory 141 and a general purpose volatile memory 142 for temporarily storing secure data and data associated with the general purpose applications for the first core processing unit 100, respectively. The secure boot ROM 120 has secure boot instructions and a first private key 910 stored therein. The secure boot ROM 120 may be a piece of mask ROM or write-protected flash embedded inside the chip. The first private key 910 is provided by the device maker and is used for other devices, e.g., microcontroller programmer/burner, to verify the secure electronic device 100. The first communication interface 150 is used for the secure electronic device 100 to communicate with other devices. The secure electronic device 100 may be a SoC with content protection features based on ARM TrustZone technology.

The secured executable codes may be provided by developers other than the chip maker. The first code transfer device 200 in FIG. 1 is used for a developer to transfer secured executable codes to the secure electronic device 100. The secure electronic device 100 may not be necessary if a developer is going to transfer general purpose applications. The first code transfer device 200 includes a second core processing unit 210, a second protected non-volatile memory 230, a second protected volatile memory 240, and a second communication interface 245. The second protected non-volatile memory 230, the second protected volatile memory 240, and the second communication interface 245 are coupled to the second core processing unit 210, and they may form a SoC to improve the security of the first code transfer device 200. The first code transfer device 200 is used to implement a secure execution environment that all communications between the first code transfer device 200 and other devices are supervised by an authentication process. The second core processing unit 210 comprises a secure environment 211 where the instructions of the authentication process and a secured executable codes transferring process are executed therein. The second protected non-volatile memory 230 has a first public key 911, a second private key 920, and first secured executable codes 231 stored therein. At least a portion of the second protected non-volatile memory 230 where the first public key 911, the second private key 920, and the first secured executable codes 231 stored therein is protected by a protection mechanism to prevent the stored codes and data from being directly accessed by any external agent. The protection mechanism may be "FlashLock™ with AES" mentioned by Sergei Skorobogatov and Christopher Woods. Breakthrough Silicon Scanning Discovers Backdoor in Military Chip. Cryptographic Hardware and Embedded Systems—CHES 2012: p 23-40. The second protected volatile memory 240 is used to temporarily store data for the second core processing unit 210. The second communication interface 245 is used for the first code transfer device 200 to communicate with other devices. The second code transfer device 300 is a device similar to the first code transfer device 220. It has a third core processing unit 310, a third protected non-volatile memory 330, a third protected volatile memory 340, and a third communication interface 345. The third core processing unit 310 comprises a secure environment 311 where the instructions of the authentication process and a secured executable codes transferring process are executed therein. The second private key 920 and first secured executable codes 231 in the first code transfer device 200 are replaced by a third private key 930 and second secured executable codes 331, respectively. The second code transfer device 300 is used for another developer to transfer the second secured executable codes to the secure electronic device 100.

Figure 2:
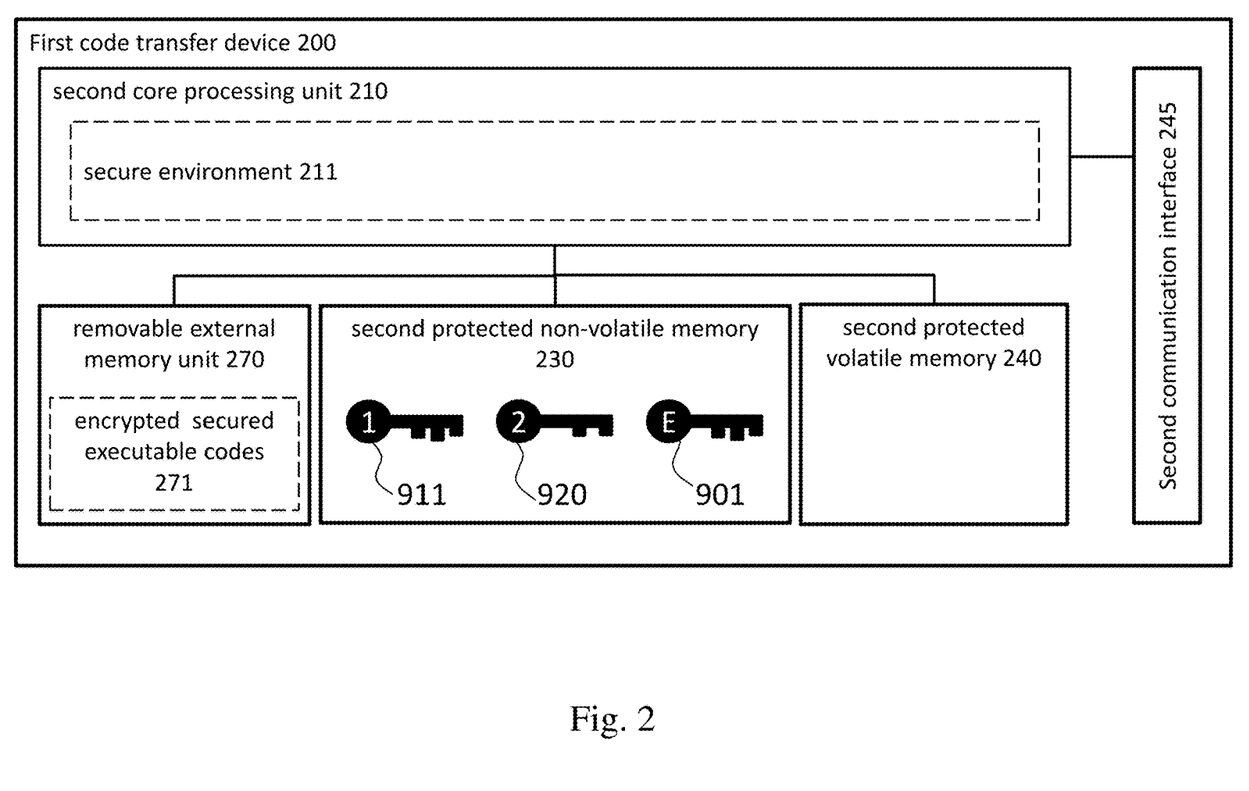
FIG. 2 is a block diagram of another code transfer device of a second embodiment according to the present invention.

Please refer to FIG. 2. FIG. 2 is another embodiment of the first code transfer device 200. The difference between the present embodiment and the previous embodiment is that the secured executable codes are not stored in the second protected non-volatile memory 230, but are encrypted using a file encryption key 901 and may be stored as an encrypted file in a removable external memory unit 270. The encrypted file is shown as the encrypted secured executable codes 271 in FIG. 2. The file encryption key 901 stored in the second protected non-volatile memory 230 is used to decrypt the encrypted secured executable codes 271. The removable external memory unit 270 may be a Secure Digital memory card (SD card) and connected to the second core processing unit 210 using a Secure Digital Input Output (SDIO) interface. The file encryption key 901 may be a key used in symmetric-key cryptography, e.g., Advance Encryption Standard (AES).

In this paragraph, the framework of the content protection features provided by the secure electronic device 100 will be described in detail. Basically, the content protection features framework will be divided into three parts: the secure electronic device, the code transfer device, and the communication therebetween. In the secure electronic device 100, two major elements work together to build up the content protection features. The first element is that the secure execution environment isolated from a normal execution environment makes contents in the secure execution environment protected. The second element is that a portion of the first protected non-volatile memory 131 where the secured executable codes stored therein is configured into execute-only memory (XOM). The U.S. Pat. No. 7,895,404 discloses a method to provide execute-only access rights for one or more protected areas of the memory. Utilizing XOM allows only instruction fetches, while read and write accesses are not allowed. Therefore, storing secured executable code provided by one developer in execute-only memory prevents another developer from reading the code. The secure execution environment provides a first layer of contents protection between the secure execution environment and the normal execution environment, while the XOM provides a second layer of contents protection between each secured executable codes inside the secure execution environment. Sensitive data which should not be accessed by general purpose applications in the normal environment 112 is now able to be shared between different secured executable codes from different developers without compromising the secrecy of each secured executable code. Using XOM may also provide additional tamper resistance for the secure electronic device 100. In the code transfer device 200, the secured executable codes are protected by the secure execution environment 211 with either the file encryption key 901 or the protection mechanism, e.g., FlashLock™.

Figure 3:
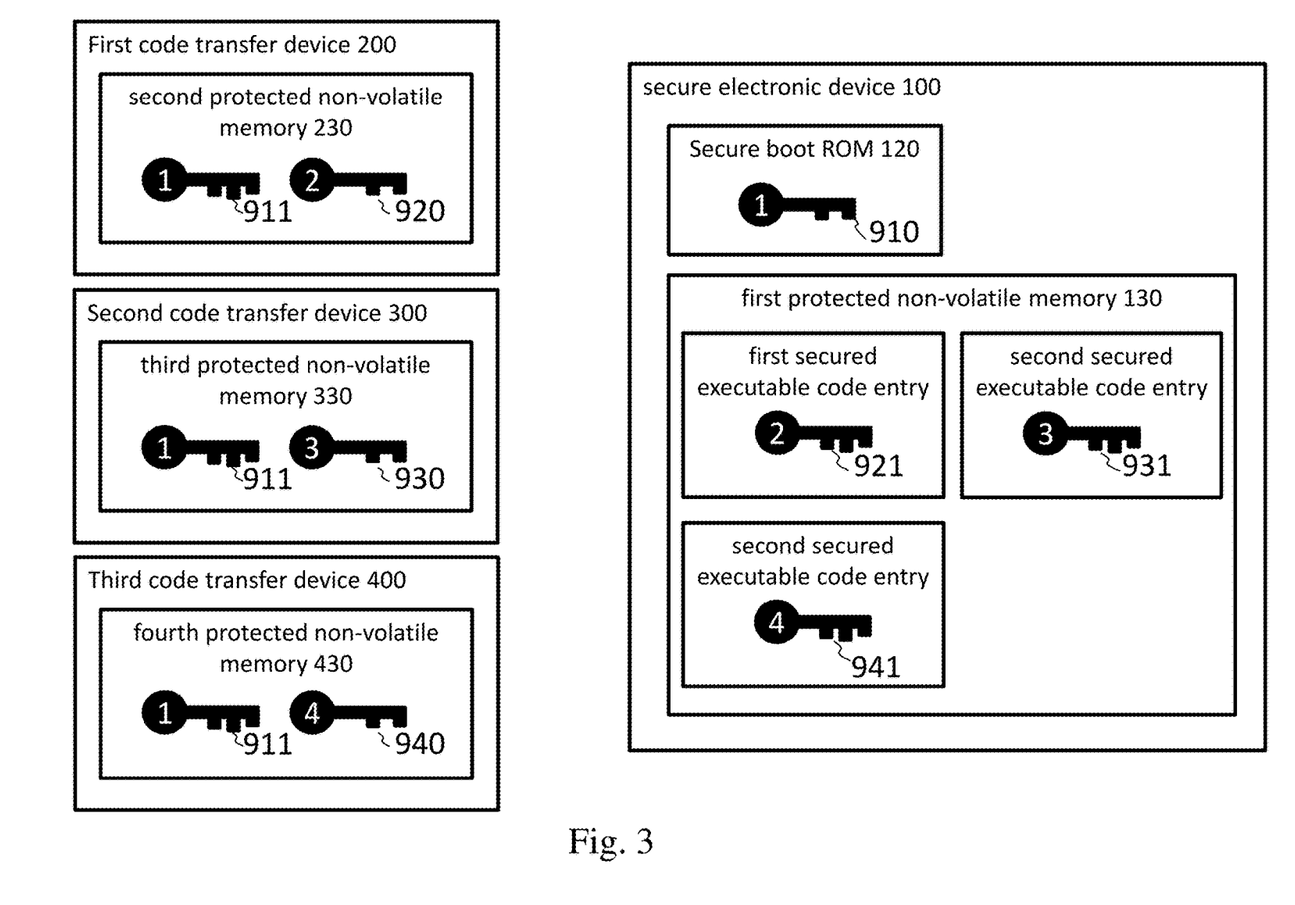
FIG. 3 is a block diagram of still another secure electronic device and three code transfer devices of a third embodiment according to the present invention.

As to the communication between the secure electronic device 100 and the code transfer device 200, the bi-directional verification is used for the two devices to verify each other. Please refer to FIG. 3. FIG. 3 is a block diagram of a secure electronic device and three code transfer devices of a third embodiment according to the present invention. Other elements are not significantly related to the bi-directional verification and neglected here. The first public key 911 and the first private key 910 are a pair of keys of the first asymmetrical cryptography used for the first code transfer device 200 to verify the secure electronic device 100. The second public key 921 and the second private key 920 are a pair of keys of the second asymmetrical cryptography used for the secure electronic device 100 to verify the first code transfer device 200. The third public key 931 and the third private key 930 are a pair of keys of the third asymmetrical cryptography used for the secure electronic device 100 to verify the second code transfer device 300. A fourth public key 941 and a fourth private key 940 are a pair of keys of a fourth asymmetrical cryptography used for the secure electronic device 100 to verify a third code transfer device 400. Similar to other code transfer devices, the fourth private key 940 and the first public key 911 are stored in a fourth protected non-volatile memory 430 in the third code transfer device 400. Once a secured executable code entry exists in the secure electronic device 100, the secured executable code is able to be read and/or modified only if the bi-directional verification succeeds. In the case that the secured executable codes are stored in the removable external memory unit 270, the secured executable codes are further protected by the file encryption key 901. Thus, the contents, i.e., the secured executable codes, are well-protected under this framework. If no secured executable code entry exists in the secure electronic device 100, the secured executable code is able to be written into a predetermined memory area while the verification of the first secure electronic device 100 succeeds (by the code transfer device 200).

Figure 4:
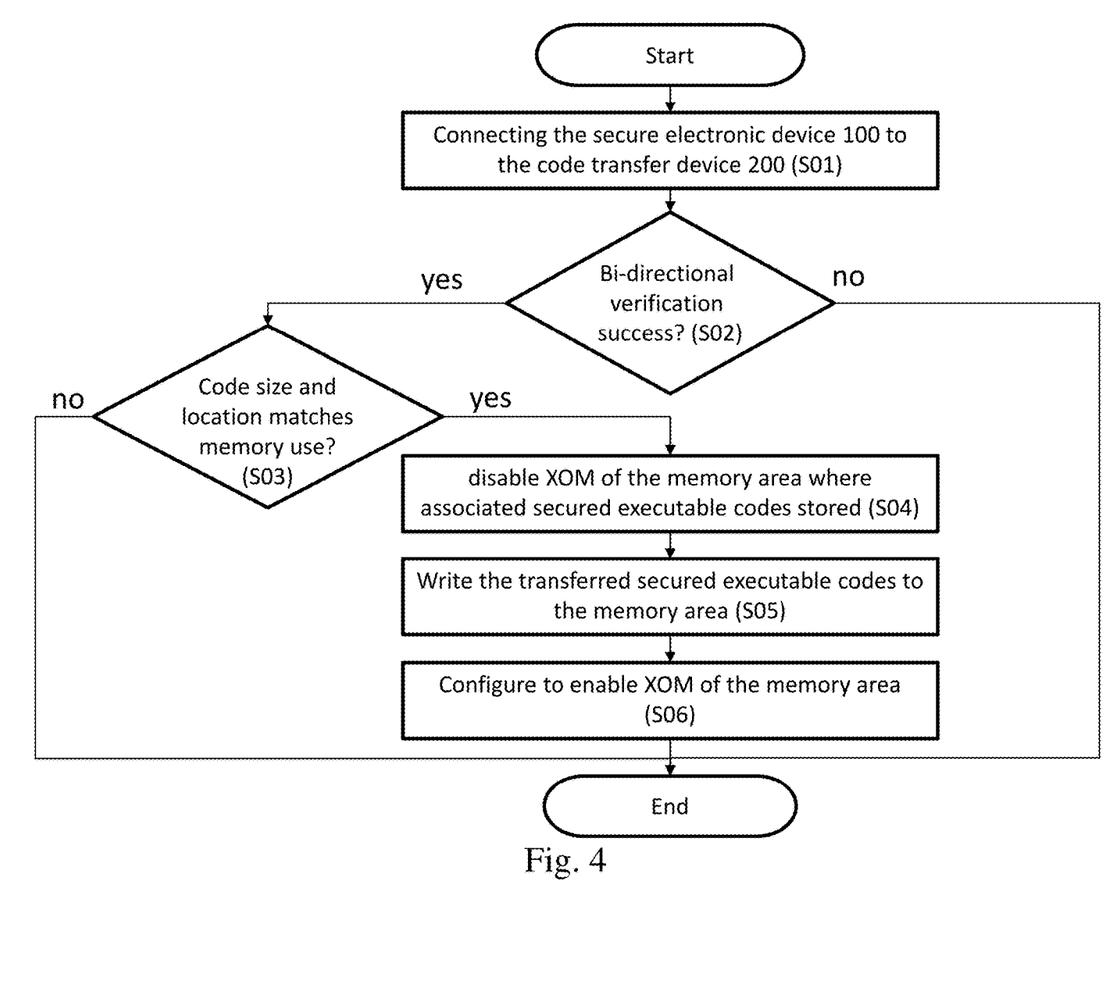
FIG. 4 shows exemplary processes of the communication between the secure electronic device and the code transfer device.

Please refer to FIG. 4. FIG. 4 shows an exemplary process of the communication between the secure electronic device 100 and the code transfer devices. The exemplary process includes the authentication process and the secured executable code transferring process. In this example, a new version of the secured executable codes will be written into the corresponding memory area to replace the old version. Which secured executable codes will be replaced is determined by the bi-directional verification process. If the secure electronic device 100 is connected to the second code transfer device 300, the bi-directional verification will give a result that the second secured executable code will be modified because the third public key 931 and the third private key 930 are a key pair. The process begins by connecting the secure electronic device 100 to the code transfer device 200 (S01) using the communication interfaces. The process includes determining whether the bi-directional verification succeeds (S02). Both devices will recognize each other as a valid device to communicate with if the bi-directional verification succeeds. The usable memory size and location of the first protected non-volatile memory 113 will be checked (S03) before transferring the secured executable codes. One simple way is that the secured executable codes have a predetermined code size and location in the first protected non-volatile memory 113. There may be a table or list for storing information of the memory usage in the first protected non-volatile memory 113. If the result of step S03 is yes, then the portion of the first protected non-volatile memory 113 where the associated secured executable codes stored therein is configured to disable the execute-only attribute (S04), i.e., becoming readable and writable. The new secured executable codes will be transferred to the secure electronic device 100 and be written into the memory area (S05). In the last step, the memory area will be configured into XOM again to protect the secured executable codes (S06). When verification fails in the step S02 or S03, the whole process stops and returns a verification failed message.

Figure 5:
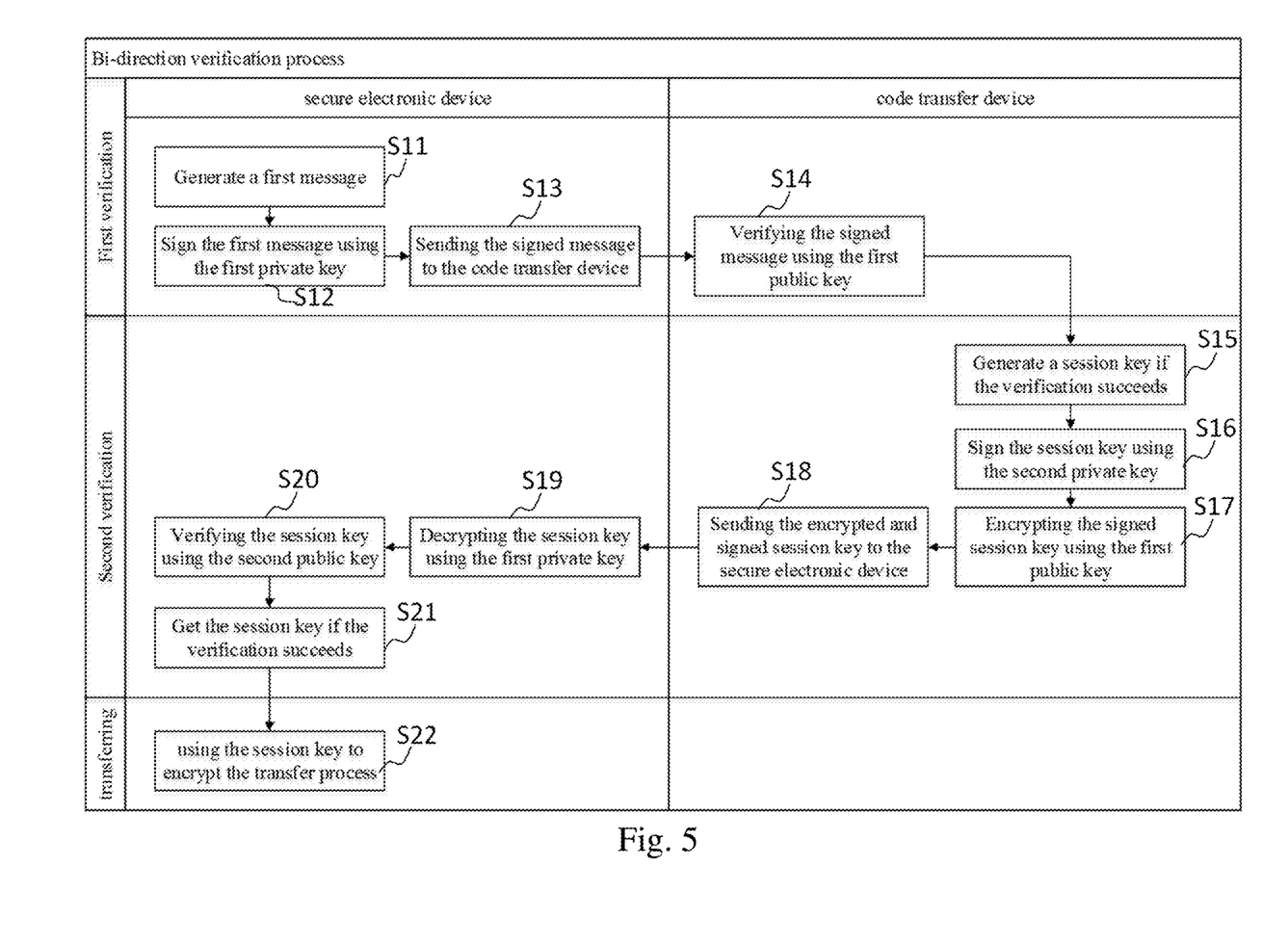
FIG. 5 shows an exemplary process of a bi-directional verification.

Please refer to FIG. 5. FIG. 5 shows exemplary processes of the bi-directional verification. The bi-directional verification process utilizes a public-key cryptosystem, e.g., RSA or Elliptic-curve cryptography (ECC) to establish a trustworthy communication. The first verification is used for the code transfer device 200 to verify the secure electronic device 100, and second verification is used for the secure electronic device 100 to verify the code transfer device 200. First, the secure electronic device 100 generates a first message (S11), signs the first message using the first private key 910 (S12), and then sends the signed message to the code transfer device 200 (S13). When the code transfer device 200 receives the signed message, the code transfer device 200 verifies the signed message using the first public key 911 (S14). If the verification succeeds, the code transfer device 200 generates a session key (S15), signs the session key (as a second message) using the second private key 920 (S16), encrypts the signed session key using the first public key 911 (S17), and then sends the encrypted and signed session key to the secure electronic device 100 (S18). The secure electronic device 100 decrypts the encrypted and signed session key using the first private key 910 (S19) and verifies the session key using the second public key 921 (S20). If the verification succeeds, the secure electronic device 100 gets the session key (S21) and uses the session key to encrypt the transfer process (S22). If multiple secured executable code entries exist in the secure electronic device 100, each of the public keys in the secured executable code entries will be used in the step S20 to find out the corresponding secured executable code entry.

Figure 6:
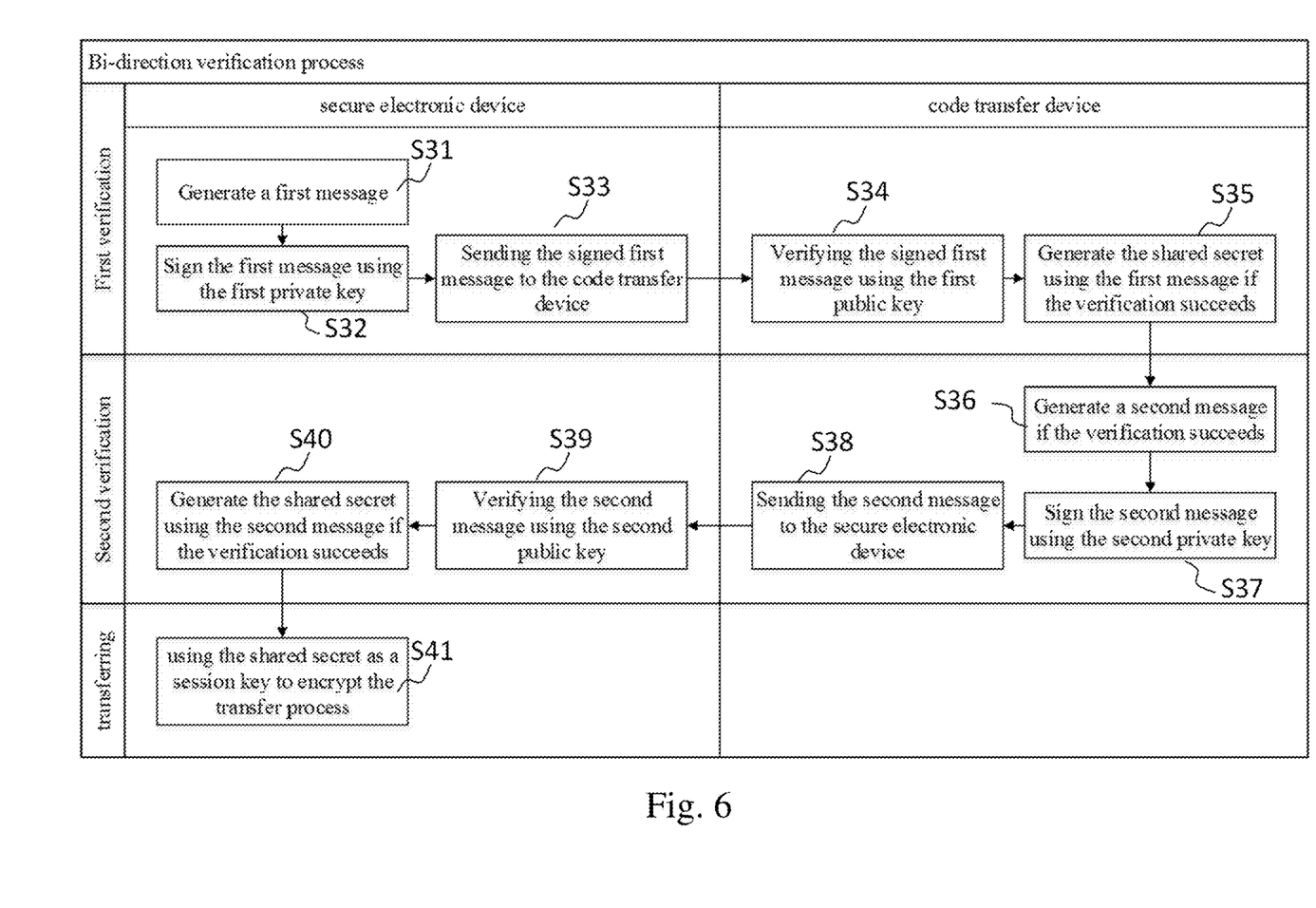
FIG. 6 shows another exemplary process of the bi-directional verification.

Please refer to FIG. 6. FIG. 6 shows another exemplary process of the bi-directional verification. In this example, the session key is generated using Diffie-Hellman key exchange protocol, which is used for ECC key exchange. Elliptic-curve Diffie-Hellman (ECDH) is an anonymous key agreement protocol that allows two parties, each having an elliptic-curve public-private key pair, to establish a shared secret over an insecure channel. Therefore, the encrypting step S17 and the decrypting step S19 are skipped in this example. The process includes steps: the secure electronic device 100 generates a first message (S31), signs the first message using the first private key 910 (S32), and sends the signed message to the code transfer device 200 (S33). When the code transfer device 200 receives the signed first message, the code transfer device 200 verifies the signed first message using the first public key 911 (S34). If the verification succeeds, the code transfer device 200 generates a shared secret using the first message (S35) and a second message (S36), signs the second message using the second private key 920 (S37), and sends the signed second message to the secure electronic device 100 (S38). The secure electronic device 100 verifies the signed second message using the second public key 921 (S39). If the verification succeeds, the secure electronic device 100 generates the shared secret using the second message (S40) and uses the shared secret as a session key to encrypt the transfer process (S41). The first message and second message contain the information to generate the shared secret of the ECDH exchange protocol.

The removable external memory unit 270 may further include a license management system. The license management system includes an encrypted license control file and instructions to interact with the secured executable codes transferring process. The encrypted license control file may be encrypted using the file encryption key 901 or another symmetric key (not shown). The license control file stores management information, such as license counts (number of copies allowed to be made), the configuration information of each installation, etc. In one example, license counts decrease by one while each secured executable code transferring process completes. The license counts could be renewed by the developer. In another example, the secured executable codes may have different configurations, and each configuration worth different points. For example, a full function configuration of the secured executable codes may worth ten points, and a limited function configuration of the secured executable codes may worth seven points. Then, the license counting may be implemented in the form of quota or points. The license count is decremented according to the completion of each copy. For example, if a limited function configuration of the secured executable codes is transferred to the secure electronic device 100, the license count is decreased by seven.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A secure electronic device configured to implement a secure environment with a plurality of secured executable codes, and having content protection features, characterized in that the secure electronic device comprises:

a first core processing unit (CPU), for processing an authentication process, managing a secured executable code transferring process, and executing secured executable codes and general purpose applications, wherein the authentication process comprises a bi-directional verification between the secure electronic device and a plurality of code transfer devices; the first core processing unit is able to be configured into two isolate environments: a secure environment and a normal environment using hardware sliced or time sliced method so that any instructions and data inside the secure environment cannot be directly accessed from the normal environment or an external device;

a secure boot Read-Only Memory (ROM), coupled to the first core processing unit, having a first private key stored therein, wherein the first private key is used for the code transfer devices to verify the secure electronic device;

a first non-volatile memory, coupled to the first core processing unit, wherein the first non-volatile memory is able to be configured into two isolated parts:

a first protected non-volatile memory, for storing a first secured executable code entry and a second secured executable code entry; and a general purpose non-volatile memory, for storing general purpose applications and data associated with the general purpose applications, wherein the first secured executable code entry comprises a first secured executable code and a second public key of a second asymmetrical cryptography; the second secured executable code entry comprises a second secured executable code and a third public key of a third asymmetrical cryptography; the second and third public keys are used for the secure electronic device to verify the code transfer devices; at least a portion of the first protected non-volatile memory where the secured executable codes stored therein is configured into execute-only memory (XOM);

a first volatile memory, coupled to the first core processing unit, wherein the first volatile memory is able to be configured into two isolated parts:

a first protected volatile memory, for temporarily storing secure data for the core processing unit; and a general purpose volatile memory, for temporarily storing data associated with the general purpose applications for the core processing unit; and a first communication interface, for communicating with the code transfer devices, wherein the data exchange between the secure electronic device and the code transfer devices are encrypted/decrypted using a symmetric session key if the authentication process is successful, wherein a first public key stored in the code transfer devices and the first private key are a pair keys of a first asymmetrical cryptography; the second public key and a second private key stored in a first code transfer device are a pair keys of the second asymmetrical cryptography; and the third public key and a third private key stored in a second code transfer device are a pair keys of the third asymmetrical cryptography.

2. The secure electronic device according to claim 1, wherein the code transfer device comprises:

a second core processing unit, for processing an authentication process and managing the secured executable code transferring process;

a second protected non-volatile memory, for storing the first public key of the first asymmetrical cryptography and one of the private keys, wherein at least a portion of the second protected non-volatile memory where the first public key and the private key stored therein is protected by a protection mechanism to prevent the stored codes and data from being directly accessed by an external agent;

a second protected volatile memory, for temporarily storing data for the second core processing unit; and a second communication interface, for communicating with the secure electronic device.

3. The secure electronic device according to claim 2, wherein the second protected non-volatile memory further stores a copy of the secured executable codes; at least a portion of the second protected non-volatile memory where the secured executable codes stored therein is protected by the protection mechanism to prevent the stored codes and data from being directly accessed by an external agent.

4. The secure electronic device according to claim 2, wherein the code transfer device further comprises:

a file encryption key, stored in the second protected non-volatile memory; and a removable external memory unit, for storing a copy of the secured executable codes, wherein the secured executable codes are encrypted using the file encryption key.

5. The secure electronic device according to claim 1, wherein the authentication process and an encrypt/decrypt system used in the secured executable code transferring process are hardware circuits built in the first core CPU, or instructions stored in the secure boot ROM and been executed by the first core CPU after a boot sequence.

6. The secure electronic device according to claim 1, wherein the first asymmetrical cryptography is Elliptic-curve cryptography (ECC) or RSA.

7. The secure electronic device according to claim 1, wherein the second asymmetrical cryptography is ECC or RSA.

8. The secure electronic device according to claim 1, wherein the secure electronic device is a system on chip (SoC).

9. The secure electronic device according to claim 1, wherein the code transfer device is a SoC.

10. The secure electronic device according to claim 2, wherein the code transfer device further comprises a license management system which comprises a license control file for storing management information.

11. The secure electronic device according to claim 10, wherein the management information comprises license counts and/or the configuration information of each installation.

* * * * *